April 20, 1926. 1,581,653
G. C. MARTIN ET AL
HYDRAULIC CONCRETE PIPE MACHINE
Filed Oct. 11, 1923 2 Sheets-Sheet 1
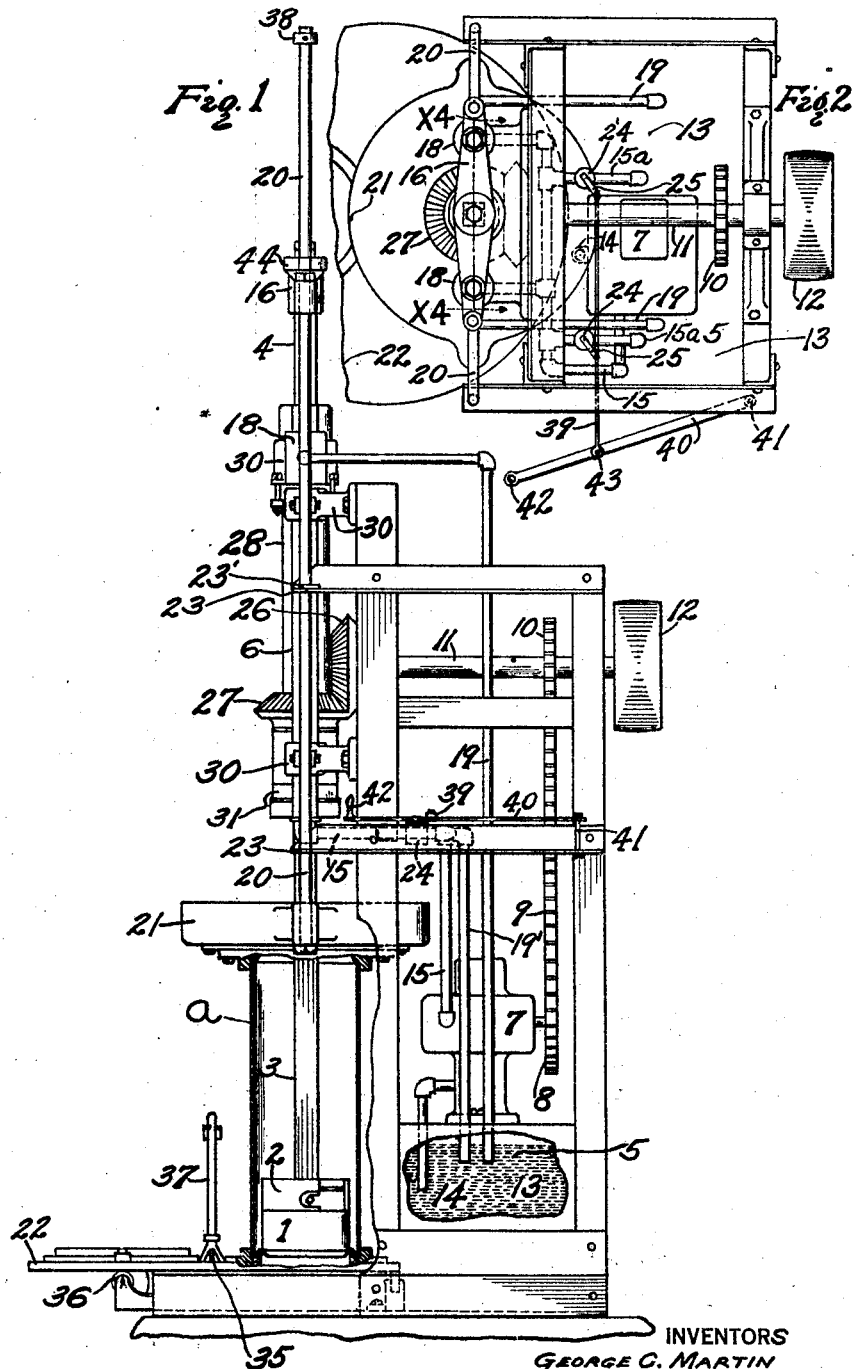
INVENTORS
GEORGE C. MARTIN
CHARLES M. CRONKHITE
BY James R. Townsend
his ATTORNEY
WITNESS:
J.A. McDowell April 20, 1926.
G. C. MARTIN ET AL
1,581,653
HYDRAULIC CONCRETE PIPE MACHINE
Filed Oct. 11, 1923   2 Sheets-Sheet 2
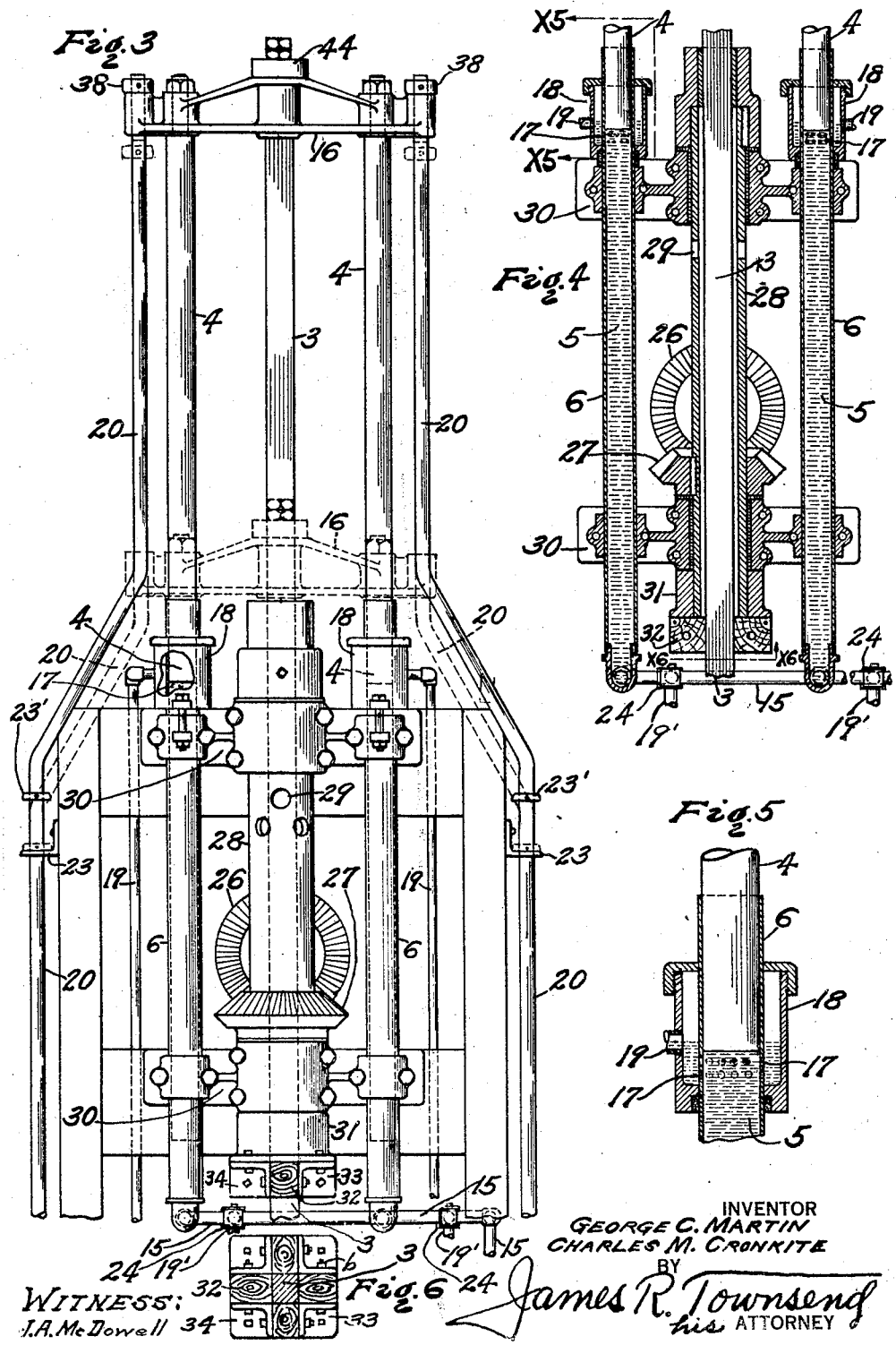
INVENTOR
GEORGE C. MARTIN
CHARLES M. CRONKITE
BY
James R. Townsend
his ATTORNEY
WITNESS:
J.A. McDowell Patented Apr. 20, 1926.

1,581,653

UNITED STATES PATENT OFFICE.

GEORGE CUSHING MARTIN AND CHARLES M. CRONKHITE, OF LOS ANGELES, CALIFORNIA.

HYDRAULIC CONCRETE-PIPE MACHINE.

Application filed October 11, 1923. Serial No. 668,022.

*To all whom it may concern:*

Be it known that we, GEORGE CUSHING MARTIN and CHARLES M. CRONKHITE, both citizens of the United States, residing at Los Angeles, in the county of Los Angeles and State of California, have invented a new and useful Hydraulic Concrete-Pipe Machine, of which the following is a specification.

This invention relates to that class of machines in which a vertically reciprocating revolving trowelling head is operable by power to trowel a moist concrete or aggregate of water, hydraulic cement, sand, broken rock and the like inside a mold for the purpose of forming a section of pipe.

In machines of this kind heretofore constructed the trowelling heads are reciprocated while being revolved and the trowelling is begun while the head is at the bottom of the mold and the plastic cementitious material of which the pipe is to be made is fed into the top of the mold from a pallet or hopper and the trowelling head is lifted and operated from bottom to top of the mold and to a level above the top of the mold.

It is necessary at the close of the upstroke that the head shall remain at a level above the top of the pipe section completed; and the cycle of operation in making a pipe section, includes; placing the mold on a turn table, revolving the turn table to bring the mold into position to receive the trowelling packer head and the plastic material, then lowering the head into the mold and to the bottom thereof, feeding the material to the mold and simultaneously therewith rotating the head and elevating the same from the bottom to the top of the mold, meanwhile placing an empty mold on the table and then rotating the table to withdraw the completed pipe and its mold from under the pallet or hopper and to put the empty mold into position for making the next piece of pipe.

An object of this invention is to shorten the time required for this cycle and this we do by providing means for lowering the head at high speed.

An object of this invention is to produce the combination with a trowelling head, of means whereby, when the head reaches the top of its movement, it will remain so elevated until released; and when released will instantly drop to initial working position; and the invention is broadly new, basic and pioneer in this respect and also with respect to the means whereby this is accomplished.

We have discovered that it is possible to accomplish this object in a practical machine by providing hydraulic means in the form of a ram or plunger operable by a hydraulic medium such as heavy oil driven by a pump, for raising and supporting the trowelling head, and a by-pass for releasing the lifting medium; an automatic by-pass being provided to limit the up-thrust of the ram when the packer head has been lifted above the mold, and means to release the liquid and allow the ram and the packer head to descend rapidly.

Another object of the invention is to provide a pipe making machine which will be perfectly under the control of the operator, and which can be manufactured at lower cost than pipe making machines of the packer head type heretofore known.

Another object of this invention is to provide an improved machine in which the lifting of the packer shaft and the packer head during its rotation and while it is operating to manufacture the pipe, is accomplished at an even rate throughout the entire length of the pipe, and a pipe of even texture and great density throughout is produced.

Other objects are simplicity and durability.

This invention is broadly new, basic and pioneer in various features, and particularly in that in this pipe making machine we have provided in combination with a revolving head, a packer shaft, and packer head, and hydraulic means for raising and lowering the shaft and head, thereby greatly reducing the weight and greatly increasing the output of the machine.

An object is to avoid the necessity of intermediate means, such as ropes, pulleys, gears, screws or other mechanical means to raise and lower the packer shaft and head and to make the operation of raising and lowering such shaft and head more direct than heretofore possible.

Other objects, advantages and features of invention may appear from the accompanying drawings, the subjoined detail description and the appended claims.

The invention may be carried out in various forms.

The accompanying drawings illustrate the invention in the form at present deemed most satisfactory.

Figure 1 is an elevation of a hydraulic cement pipe machine constructed in accordance with this invention. The packer head is shown lowered in a mold to the initial trowelling level.

Fig. 2 is a fragmental plan view of the machine shown in Fig. 1.

Fig. 3 is an enlarged fragmental view showing in front elevation, some of the parts going to make up this invention. Full lines indicate the position of parts when the packer head is at the highest point, and dotted lines indicate the lowest position of such parts.

Fig. 4 is an enlarged fragmental section on line $x^4$, Fig. 2. This view shows the hydraulic cylinders with the rams held at their highest point by the pressure of oil.

Fig. 5 is an enlarged fragmental axial section showing in detail parts embraced by line $x^5$, Fig. 4.

Fig. 6 is a bottom view of the wood blocks and clamps holding the packer shaft which is shown in section.

The trowelling packer head is of usual construction comprising the cylindrical section 1 and the trowelling arms 2 carried by the packer shaft 3 that is supported by hydraulic pistons or rams 4 that are operated by a hydraulic medium 5 which may be a heavy oil or other suitable practically non-compressible fluid, within the hydraulic cylinders 6 to which the medium 5 is delivered by a powerful hydraulic pump 7 driven through sprocket gearing 8, 9, 10 leading from the main shaft 11 that is connected through gearing 26, 27 to revolve the packer shaft 3 and packer head 2, and that is driven through pulley 12 by power from any suitable source as an electric motor, not shown, to pump the medium 5 from a reservoir 13 forming part of a hydraulic circuit. Said pump is connected by suction pipe 14 with said reservoir to draw liquid therefrom and is adapted to force the medium 5 through pipes 15 to act upon the lower ends of the hydraulic cylinders 6 which are vertically arranged on opposite sides of the packer shaft 3 that is carried by cross-head 16 to which the pistons 4 are fixed and with which the shaft 3 and the packer head 1 move up as the liquid is pumped against the lower ends of said pistons.

The cylinders 6 are provided at their upper ends with vents 17 that open into a cup 18 connected by a gravity return pipe 19 with the reservoir 13. The return passage formed by the vents or perforations 17 and the return pipe 19 is of sufficient capacity to relieve the hydraulic pressure on the pistons 4, allow the pistons to reach a state of equilibrium, and thus determine the heights to which the pistons will be lifted and at which they will be held by the hydraulic pressure from the pump.

Standards 20 are fixed to and extend up from the usual pallet or hopper 21, and are connected at their upper ends by lost motion means to the yoke 16 to be lifted thereby at the end of the up-stroke of the pistons 4, so that when the packer head is lifted above the level of the mold and of the completed length of pipe, not shown, the pallet 21 will be lifted above the level of the mold $a$ so that the mold and the piece of pipe therein, not shown, may be removed from beneath the pallet by rotation of the turn table 22.

The hydraulic medium 5 is pumped from the reservoir or sump 13 by the pump 7, through the pipes 15 into the lower ends of the cylinders 6 thereby lifting the rams until they pass a sufficient number of the perforations to allow said medium to vent through the perforations 17 into the cup 18 from whence it flows through the pipe 19 back into the reservoir 13 to supply the pump circuit. The rams are thus supported in elevated position to hold the yoke 16, the packer shaft 3 and the packer head 1 above the level of the mold.

The standards 20 are vertically movable through guides 23 and are provided with shoulders which may be collars 23' adapted to rest on certain of said guides when the pallet 21 engages the top of the mold $a$. Said guides hold the pallet alined with the mold, and the pallet is adapted to engage the mold and to hold the mold in place when the standards are in their lowest position shown in Fig. 1, in which position said standards remain at all times except at the later portion of the up stroke of the pistons 4, and then the packer head is lifted above the completed pipe, and the pallet or hopper 21 is also lifted so as to leave the mold free to be removed by rotation of the turn table 22.

By-pass and return pipes 19' controlled by by-pass and return valve 24 are provided to reverse the operation of the machine without interfering with the continuous operation of the pump.

The lever 25 under control of the operator may be manipulated to open the valve 24 to such an extent as to allow the medium 5 from the pump and also from the cylinders to return to the reservoir or sump 13.

When the valves 24 are fully opened the medium upholding the piston may return so quickly that the pistons are virtually dropped instantaneously, thus lowering the packer head to the initial position shown in Fig. 1, and also allowing the pallet to engage the top of the mold.

In practical use the operator will start the pump and close the valves 24 so that liquid is pumped from the sump to elevate the pistons and packer head to their highest position. A workman will place the mold upon the turn table and revolve the table to bring the mold under the pallet to receive the packer head, and then the operator will open the valve 24, thus allowing the packer head to drop to initial position. Then the cementitious material from which the pipe is to be made will be introduced into the mold through the hopper or pallet and the valves 24 will be closed to such an extent as may produce a required ascent of the packer head which is constantly revolved in the usual way by means of the gear 26 on shaft 11 meshing with gear 27 that is arranged to rotate the packer shaft 3.

The rotary motion of the packer head is obtained by means of the power shaft 11 through the bevel gear 26 into the bevel gear 27 through which the square packer shaft 3 passes, so that rotation of the pulley 12 rotates the shaft 11, gears 26, 27 and the packer shaft 3.

The housing 28 is a hollow casting with holes 29 for egress of dirt, sand and gravel which may be carried up by the packer shaft inside the housing 28 which is supported and carried by upper and lower bearings 30 and 31.

32 shows wooden blocks bolted between clamps 33 and 34 that engage the square packer shaft 3 and which may be adjusted by loosening the bolts b in plates 33 and 34 to hold the shaft rigid during course of operation, and as a result of wear which may occur either in the shaft or blocks 32. There are four of the blocks 32 one on each side of the square shaft 3.

The turn table 22 is pivoted at 35 and is provided with wheels 36 to facilitate its rotation. 37 is a handle attached to the side of the turn table for conveniently rotating the same.

Nuts 38 on standards 20 are the means for picking up standards 20 when the yoke 16 reaches the top of its travel for the purpose of raising pallet or hopper 21 above the top of the mold a after the piece of pipe has been completed.

The drawing shows the valves 24 operated by two levers 25 which in turn are engaged by one rod 39 which, in turn is operated by a lever 40 pivoted at 41, and provided with a handle 42 conveniently located at its free end; said lever and said rod being pivoted at their intersection 43.

44 is a bearing permanently attached to the top of shaft 3 the purpose of which is to reduce friction between the rotating packer shaft 3 and the supporting bearing 16 during operation.

It is thus seen that by providing a pipe machine having a packer shaft with a hydraulic ram lifting means for raising and lowering said packer shaft, we have made it possible to maximize the speed of operation, and at the same time have provided for continuous operation of the packer shaft and other parts without the necessity of any reversing gears or mechanism and that by making the driving mechanism such as the shaft 11, and the gearing between the power shaft 11 and the shaft 3, operate independently of the lifting means, the revolving of the packer head may be continuous at a predetermined speed while the raising and lowering of the packer head can be effected at widely varying rates of speed.

By providing the vents 17 and thus voiding the hydraulic medium from the top of the cylinders, we have made it practical to operate the packer head in its up and down movement by the manipulation of the by-pass valve without danger of breaking from over strain. It is understood that the duplication of valve 24 and pipe 19' is simply for convenience to give the requisite flow.

By connecting the hydraulic lifting ram with a pump that is operated by the main drive shaft which revolves the packer head, we have made provision for great simplicity of construction and installation in pipe machines. By employing the hydraulic means for raising and lowering the packer shaft and controlling the same by the valve, we have made it possible to control the packer head either at the top or bottom of its travel or at any point in between; and by means of vents 17 we have made it impossible to excessively lift the packer head and the pallet; and by directly lifting the packer shaft carrying the packer head, simplicity and power are both secured with a light construction.

We claim:

1. A pipe machine having a packer shaft and a hydraulic current applicable as lifting means for raising the packer shaft, and also operable at high speed to return the shaft to neutral position.

2. A pipe machine comprising a packer head; a hydraulic lift therefor and a by-pass valve by which the said lift is controlled in its up and down movement, and a relief vent limiting its upward movement.

3. In a pipe machine in combination a hydraulic lifting ram with a pump operated by a main drive shaft; a packer head, and means whereby the packer head is revolved by the main drive shaft and is raised and lowered by said lifting rams.

4. Hydraulic means for raising and lowering packer shaft by operation of a valve so that raising or lowering can be controlled either at top or bottom of travel of packer shaft or at any point in between, means to relieve the pressure at a predetermined point, thus limiting the upward movement of said packer shaft.

5. In a pipe machine a packer shaft carrying a packer head, hydraulic ram lifting means for directly raising and lowering the packer shaft, and means connected to rotate said packer head and to operate the hydraulic means.

6. A concrete pipe machine comprising a packer head; means to revolve the head; hydraulic means to lift and support the head; and means whereby the supporting means may be released and the head allowed to drop by gravity at high speed to the level at which the trowelling and packing operation is required to begin.

7. A concrete pipe machine comprising a packer head, means to revolve the head, hydraulic pressure means to lift and support the head, means relieving said pressure in the lifted position of said head, to hold said head at a predetermined level, and means whereby the supporting means may be released and the head allowed to drop by gravity to the level at which trowelling and packing operations begin.

8. A concrete pipe machine comprising a packer head, means to revolve the head, hydraulic pressure means to lift and support the head, automatic means relieving said pressure in the lifted position of said head, to hold said head at a predetermined level, and means whereby the supporting means may be released and the head allowed to drop by gravity at high speed to the level at which trowelling and packing operations begin.

9. A concrete pipe machine comprising a packer head, means to revolve the head, hydraulic pressure means to lift and support the head; a mold, a pallet above said mold, means to raise said pallet from said mold in the raised position of said packer head, means to relieve the pressure means and thus return the head to the level at which packing operations begin.

10. A concrete pipe machine comprising hydraulic cylinders, pistons in said cylinders, a packer shaft, means coupling said pistons and said shaft, fluid pressure means actuating said pistons, and a vent adjacent the top of said cylinders to limit the upward movement of said pistons.

11. A concrete pipe machine comprising hydraulic cylinders, pistons in said cylinders, a packer shaft, means coupling said pistons and said shaft, fluid pressure means actuating said pistons, a vent adjacent the top of said cylinders to limit the upward movement of said pistons; a pallet, a mold under said pallet, and means coupling said pistons and said pallet to lift said pallet in the raised position of said pistons.

12. A concrete pipe machine comprising hydraulic cylinders, pistons in said cylinders, a packer shaft, means coupling said pistons and said shaft, fluid pressure means actuating said pistons, and a vent adjacent the top of said cylinders to limit the upward movement of said pistons, said vent being operable by said pistons.

13. A concrete pipe machine comprising hydraulic cylinders, pistons in said cylinders, a packer shaft, means coupling said pistons and said shaft, fluid pressure means actuating said pistons, a housing in which said shaft is slidably mounted, bearing means for said housing, and means to rotate said housing.

14. A concrete pipe machine comprising hydraulic cylinders, pistons in said cylinders, a packer shaft, means coupling said pistons and said shaft, fluid pressure means actuating said pistons, a housing in which said shaft is slidably mounted, bearing means for said housing, and means operating to rotate said housing, and also operating to supply the fluid under pressure.

15. A concrete pipe machine comprising hydraulic cylinders, pistons in said cylinders, a packer shaft, means coupling said pistons and said shaft, fluid pressure means actuating said pistons, a housing in which said shaft is slidably mounted, bearing means for said housing, means to rotate said housing; and a by-pass vent in said cylinders, limiting the upward movement of said pistons and sustaining said pistons in the raised position.

16. A concrete pipe machine comprising hydraulic cylinders, pistons in said cylinders, a packer shaft, means coupling said pistons and said shaft, fluid pressure means actuating said pistons, a housing in which said shaft is slidably mounted, bearing means for said housing, means to rotate said housing, a pallet adapted to rest on a mold, and means coupling said pallet and said pistons to raise said pallet, in the raised position of said piston.

17. A concrete pipe machine comprising hydraulic cylinders, pistons in said cylinders, a packer shaft, means coupling said pistons and said shaft, fluid pressure means actuating said pistons, a housing in which said shaft is slidably mounted, bearing means for said housing, means adapted and arranged to rotate said housing, and also to supply the fluid under pressure, a by-pass vent in said cylinders, limiting the upward movement of said pistons and sustaining said pistons in the raised position, a pallet adapted to rest on a mold, and means coupling said pallet and said pistons to raise said pallet in the raised position of said pistons.

18. A concrete pipe machine comprising hydraulic cylinders, pistons in said cylinders, a packer shaft, means coupling said pistons and said shaft, fluid pressure means actuating said pistons, a housing in which said shaft is slidably mounted, bearing means for said housing, means to rotate said housing, a cup formed at the upper ends of said cylinders, said cylinders having perforations therein leading to said cup, and a drain pipe leading from said cup.

19. A concrete pipe machine comprising hydraulic cylinders, pistons in said cylinders, a packer shaft, a cross head secured to said pistons, said shaft being journalled and supported therein, fluid pressure means actuating said pistons, a housing in which said shaft is slidably mounted, bearing means for said housing; and means to rotate said housing.

20. A concrete pipe machine comprising hydraulic cylinders, pistons in said cylinders, a packer shaft, a cross head secured to said pistons, said shaft being journalled and supported therein, fluid pressure means actuating said pistons, a housing in which said shaft is slidably mounted, bearing means for said housing; means to rotate said housing; a pallet adapted to rest on a mold, and rods rising from said pallet, said rods being adapted to be engaged by said cross head in the raised position thereof to raise said pallet from the mold.

In testimony whereof, we have hereunto set our hands at Los Angeles, California, this 5th day of October, 1923.

GEORGE CUSHING MARTIN.
CHARLES M. CRONKHITE.